Jan. 20, 1970     A. EGGENMÜLLER ET AL     3,490,613
DEVICE FOR AUTOMATICALLY LOADING BALES OF STRAW, HAY OR THE
LIKE ONTO A TRANSPORT WAGON

Filed June 6, 1968     13 Sheets-Sheet 1

INVENTORS
ALFRED EGGENMÜLLER
HEINRICH BELLAN

BY
Woodhams, Blanchard & Flynn
ATTORNEYS

Jan. 20, 1970  A. EGGENMÜLLER ET AL  3,490,613
DEVICE FOR AUTOMATICALLY LOADING BALES OF STRAW, HAY OR THE
LIKE ONTO A TRANSPORT WAGON
Filed June 6, 1968  13 Sheets-Sheet 9

INVENTORS
ALFRED EGGENMÜLLER
HEINRICH BELLAN

BY Woodhams, Blanchard & Flynn
ATTORNEYS

United States Patent Office 3,490,613
Patented Jan. 20, 1970

3,490,613
DEVICE FOR AUTOMATICALLY LOADING BALES OF STRAW, HAY OR THE LIKE ONTO A TRANSPORT WAGON
Alfred Eggenmüller, Wilhelm-Leuschner, and Heinrich Bellan, Thalfingen, Germany, assignors to Gebruder Eberhardt, Ulm (Danube), Germany, a corporation of Germany
Filed June 6, 1968, Ser. No. 734,977
Claims priority, application Germany, June 9, 1967, E 34,155; June 14, 1967, E 34,184, E 34,185
Int. Cl. B60p 1/38, 1/48
U.S. Cl. 214—6    32 Claims

ABSTRACT OF THE DISCLOSURE

A device for automatically loading bales onto a transport wagon having a loading surface, at least a portion of which comprises a moving floor. A lifting mechanism is provided adjacent the end of the moving floor for conveying bales upwardly for building a vertical stack thereof adjacent the moving floor. A holding means cooperates with the lifting means for preventing the bales from falling back during the lowering of the lifting means. A moving wall means positioned adjacent the moving floor moves the stack of bales onto the loading surface of the wagon. A receiving mechanism positioned adjacent the front side of the wagon picks up the bales from a field and feeds same to the lifting mechanism.

---

This invention relates to a device for automatically loading bales of straw, hay or the like onto a transport wagon having a loading surface. An apparatus arranged behind a receiving mechanism conveys the bales upwardly and builds a vertical stack above the conveyor mechanism, which moves the stack onto the load carrying surface of the transport wagon.

A device is known in which an automatic loading of bales by a collecting high-pressure press is possible by one man, namely, the driver of the tractor. Said known device comprises a transport wagon which can drive itself or can be pulled, said wagon having three platforms which are arranged in series and which are tiltable at 90°, whereby a receiving mechanism for the bales on the ground is arranged laterally in front of the first platform. Said receiving mechanism picks up each bale separately and moves same to the first platform. As soon as two bales are positioned on the first platform, same is tilted at 90° and the bales are passed on to the second platform which has room for four pairs of bales, thus for eight bales. When the second platform is filled, same is tilted at 90° so that the bales thereon thus form a stack which is placed on the third platform. During the next tilting process the stack or rather the preceding stacks are each moved on the platform by the pressure which the tilting stack imposes on the load. If the third platform which actually forms the actual load carrying surface of the transport wagon, is filled, the load is driven to a haystack and is tilted rearwardly so as to unload same.

In this known device, only the last platform is used for loading of bales while the first and second platforms operate only as a stacking mechanism. The three platforms arranged in series result in an extremely long and expensive structure which is thus undesirably costly.

A wagon which is to be loaded should have a large holding capacity and should be relatively short, purely for reasons of traffic and use because, if not used, the wagon must be parked under a roof. For these reasons, the known device was able to be introduced in practice only to a limited extent.

Another device for automatically loading bales comprises an apparatus arranged behind a receiving mechanism for conveying bales upwardly, said apparatus being constructed as a stacking mechanism. Here the bales lifted up from the ground by the receiving mechanism are moved to a base arranged transversely to the transport wagon. From there, the stacking mechanism, which at the same time forms the front of the wagon, takes over the bales and conveys same upwardly and forms thereby a stack up to the loading height. If the stack has reached the loading height, same is moved rearwardly to the loading surface of the wagon, which loading surface is constructed as a rearwardly tiltable platform.

This known stacking mechanism which is arranged on the front end of the transport wagon before the loading surface essentially comprises two or more lifting forks which are movable up and down on guides which are arranged vertically. Said lifting forks are driven directly either by a lever link means controlled through a cam guide or each by a hydraulic cylinder whereby in the latter case the lifting forks must be additionally constructed so as to be either pivotable about a vertical axis or movable in a horizontal direction.

The drive of the lifting forks through a lever link means results in an expensive and bulky construction which is provided in front of the transport wagon and thus extends the length of said wagon considerably so that the loading area is small in proportion to the total length of the wagon. It the lifting forks are driven directly through hydraulic cylinders, aside from the drives for the up and down movement, additional hydraulic drives for the swinging or back and forth movement are required. Furthermore, this structure requires a complicated hydraulic control system with many control valves because the discontinuous single movements of the lifting forks must be phased to one another. These circumstances are unfavorable on the price and trouble incidence of the stacking mechanism so that this device has also not been able to be introduced into practice.

It is the purpose of this invention to produce a device which makes it possible for the farmer to automatically load bales of straw, hay or the like in a one-man operation and which can be adjusted in its structure and size and the price resulting therefrom being advantageous to the various business sizes existing in the agriculture. The apparatus used for picking up the bales from the ground and for conveying said bales into the area of the loading surface is to be constructed so that said apparatus, by simple means, automatically places the bales into a correct position for stacking up on the loading surface.

Known apparatuses for conveying the bales upwardly comprise an upwardly rising conveyer arranged at one of the longitudinal sides of the loading area preferably close to the front wall. Apparatuses are known which take up the bales lying on the ground and convey same to approximately the height of the loading surface of the transport wagon. The bales are removed at the upper end of the conveyer by an operator and are stacked in the loading area of the transport wagon. However, such an apparatus is not suitable for wagons which are provided with a device for automatic stacking because the rectangular bales produced by a collecting press are lying on the ground with their longitudinal side in the driving direction while, on the transport wagon, they must be stacked normally with their longitudinal sides transverse to the driving direction, which requires a deflection of the bales of 90°.

A special tilting mechanism is known which is arranged on the upper end of the conveyer for the automatic stacking mechanism, said tilting mechanism tilting the bales conveyed by the conveyer at 90° upwardly in the longitudinal direction and then moving same transversely in such a way they are to be positioned on the transport wagon. These known conveyers with the additionally required tilting mechanism for the mechanical loading of bales is a solution which is expensive and, because of their bulky structure, is susceptible to trouble. Said solution does not only increase the total price of the wagon but also enlarges its total structural length and width whereby the movability and maneuvering capability required in agricultural conditions are greatly impaired.

In another known bale storage device having an automatic stacking mechanism, there is arranged an upwardly sloping arc-shaped conveyor at the front end thereof. Said conveyor comprises a base, a rear wall and a front wall which are connected to the transport wagon by gusset plates and can be hinged to the wagon during the transport. The part of the rear wall which is positioned transverse to the driving direction has a chain which is provided with catches, which chain engages the bales which move onto the conveyor base during a fast drive, deflects said bales at 90° and moves same onto a conveyor belt of the conveyor, which belt is positioned transverse to the driving direction.

The embodiment of this known conveyor has, aside from the expensive and complicated structure, the disadvantage that the bales lying on the field are not safely engaged during driving. The bales must move themselves into the conveyor, like onto a carriage, without any help from a conveyor means before the bales arrive in the area of the transverse conveyor chain at the rear wall. This leads to breakdowns and undesirable interruptions in operation, particularly on uneven ground, because it is not possible to let the front end of the conveyor slide on the surface of the ground so that the bales positioned on the field can be underrun.

Since the basic purpose of the invention is to produce a device for automatically loading bales, which device requires only a single operator, it is very important to make sure that the bales positioned on the field are brought safely into the position required for further treatment by the automatic stacking mechanism in the area of the stacking mechanism without encountering the deficiencies and breakdowns which occur in the known apparatuses. Therefore, in the scope of the invention, the apparatus for picking up bales lying on the ground is constructed so that it engages the bales in a simple manner and deflects same during lifting, namely, bringing said bales into the position required for stacking same up on the transport wagon. At the same time it is to be achieved that the bales on the field during driving, when touched by the front end of the conveyor, are forcedly engaged and transported on. Furthermore, an exact guiding of the conveyor over the ground surface is achieved by a simplified structure.

Since the device for picking up the bales lying on the harvest field is mounted to the side of the transport wagon, the necessity exists of being able to deflect said receiving mechanism from its operating position into a transport position to reduce the total width of the vehicle when same must pass through public roads or small field-paths.

It is already known to arrange the receiving mechanism swingably from an operating position to a transporting position. However, this swingability is used only to swing the conveyor upwardly from the field to obtain a suitable transport height. The conveyor mechanism is for this purpose pivoted to an elongation of the driving axle of the wagon in such a way that it can pivot about said elongation and that the frame of said conveyor can, with its front end, be supported on the ground when in operating position. The total width of the vehicle is not changed during upward pivoting of the conveyor about the wheel axle. One is therefore forced to dismount the conveyor from the wagon to reduce the transport width during driving on public roads or narrow field-paths.

To reduce the total width of the vehicle, one has already made such an arrangement that the receiving mechanism with its one end is pivotable about an axis arranged on the transport wagon and extending horizontally in the driving direction. The outer end is supported by a support wheel when in the operating position. When in the transport position, the receiving mechanism can be pivoted upwardly about an axis positioned in the driving direction. The total vehicle width is by this reduced a certain amount with respect to the operating position. However, the receiving mechanism is positioned in an upwardly deflected position outside of the allowed transport width of the wagon.

Because of these disadvantages, it has already become known to mount a receiving mechanism to a transport wagon in such a way that it can be moved underneath the loading surface of the transport wagon. This, however, results in the serious disadvantage that the receiving mechanism can be lifted off from the ground only for a small distance because the height underneath the loading surface of the transport wagon is limited so that, because of too little transport height, a driving on uneven ground or bumpy field-paths is not possible. Transport wagons which are constructed as low flat beds cannot at all be provided with such a receiving mechanism.

It is also known to arrange on a transport wagon, having a loading mechanism provided in front of the loading surface, a receiving mechanism laterally at the side of the loading mechanism pivotable about an axis extending horizontally in the driving direction. When in the transporting position, the receiving mechanism can be pivoted upwardly through the loading apparatus about the axis positioned in the driving direction. This device is not suitable for transport wagons in which the loading apparatus is arranged laterally on or underneath the loading area of the wagon. Furthermore, this construction is very long whereby the movability required for agricultural conditions is greatly impaired.

The basic purpose of the invention to produce a device for automatically loading bales onto a transport wagon which, aside from a simple structure which can be used in many ways requiring a receiving mechanism, is also constructed so that the receiving mechanism when in the operating position extends over the vehicle width and is connected to the transport wagon in such a way that it can be moved into a transport position which lies within the allowable transport width without the ground clearance of the wagon being reduced or its structural length being increased.

To attain the primary purpose to produce a device which allows, in a one-man operation, an automatic loading of bales on a loading surface, the device includes a loading surface which consists of known rolling or moving floor. A lifting mechanism is arranged at one end of the moving floor below the loading surface of the transport wagon and is pivotably arranged about a transverse axis. The lifting mechanism cooperates with a holding mechanism which prevents the bales from falling back during lowering of the lifting mechanism, and the bale which is provided close to said lifting mechanism is movably guided back and forth by guide rods provided on both sides of the frame of the transport wagon and forming a parallelogram.

To construct the loading surface as a rolling or moving floor has, with respect to the known bale loading means in cooperation with the stacking mechanism of the invention, the advantage that the wagon is loaded essentially without any breakdowns and the bales are not damaged because the single bale stacks are not moved on the loading surface by overcoming frictional resistance but are moved on by the moving floor.

By arranging a lifting mechanism which comprises a part of the stacking mechanism underneath the loading surface of the transport wagon, the total length of the vehicle can be used as a loading surface so that by this, with respect to the known devices, a shorter and simpler and thus less expensive construction is achieved which, in addition, can be adjusted to the various sizes of transport wagons which are provided in agriculture and which are used on farms of different types.

The bales conveyed in pairs one after the other through the opening onto the loading surface build a stack. If the loading height of the stack is achieved, said stack must be moved on the loading surface in order to make room for the next stack. The wall provided for this purpose at the opening is, according to one embodiment of the invention, movably guided back and forth through guide rods provided on both sides on the frame of the transport wagon.

According to a preferred embodiment of the invention, the lifting mechanism is comprised of at least two lifting arms which are spaced apart and are arranged on the frame of the transport wagon, said lifting arms being connected by transverse bars whereby in the area of the front transverse bar on the lifting arms there is provided a closed or trough-shaped support for the bales with the drive for the lifting mechanism engaging the rear transverse bar.

The holding mechanism for the lifted bales has a bale holder supported on the wall and provided with barbs, which bale holder prevents the bales conveyed by the lifting mechanism into the loading area from sliding back. The holding mechanism also includes a bale support which extends over the width of the transport wagon and is arranged approximately at the height of the loading surface, being spaced from the wall by a horizontal distance slightly less than one bale width. Said support is constructed so as to be adjustable or pivotable in the longitudinal direction of the transport wagon, thereby preventing the sliding back of the bales out of the loading area. Also, adjustment of the support permits the opening in the bottom of the transport wagon to be adjusted with respect to the bale size which is to be conveyed. Above said holding mechanism, one or more bale supports stacked one on top of the other are provided for preventing tilting of the bale stack which is moved onto the loading surface.

In an advantageous embodiment of the loading surface, the rolling or moving floor is at least one bale width shorter than the length of the transport wagon so that the remaining loading surface of the transport wagon is open from below.

In order to be able to also unload the bales mechanically according to a further characteristic of the invention, the rear wall is movable for at least one bale width beyond the length of the loading surface of the transport wagon. After adjusting the rear wall beyond the loading surface and moving of the load by means of the moving floor, the bales of the rearmost stack fall downwardly through the opening thus formed between the moving floor and the rear wall, for example, onto a lift conveyer, which moves said bales to the storage area provided for same.

There is achieved by means of a bale holding mechanism arranged on the unloading end of the transport wagon, which bale holding mechanism is controlled by the bale transported on the lift coveyor, that the bales are not passed onto the lift conveyor in stacks or unorganized but separately one bale after the other.

In order to also make the receiving mechanism suitable for the requirements of a one-man operation, the device of the invention is further constructed so that the receiving mechanism comprises an actually known conveyor which has an arc shape, slopingly rising and arranged on one of the longitudinal sides of the loading area, preferably close to the front wall of the wagon. Means are provided exclusively on the bottom of the arc-shaped guide trough which is formed of a bottom and two sidewalls, which means is used for a forced, continuous receiving, deflecting and forwarding or throwing out of the bales.

According to a preferred embodiment of the invention, the conveyor means used for picking up and lifting of the bales comprises driven toothed wheels or the like arranged on the frame of the conveyor, the teeth of said toothed wheels extending through recesses provided in the bottom of the conveyor chute.

The arrangement of the toothed wheels on the conveyer and their position to one another is met according to a further characteristic in such a way that the bearing axes of two adjacent toothed wheels form an angle of less than 90°, and that the toothed wheels are arranged in a position approximately parallel to or slightly at an acute angle with respect to the inner sidewall. Thus, the toothed wheels cause the bales to easily and without trouble and with a minimum of friction slide upwardly along the inner sidewall and arrive in the stacking mechanism in a deflected position.

In order to effect the change in direction of the bales during lifting, it has been proven to be advantageous according to a further characteristic of the invention to have the receiving wheel, as seen in the conveying direction, engage the bales outside of their center of gravity and the throwing-off wheel engage the bales approximately at the center of gravity.

According to a still further preferred embodiment of the invention, the receiving wheel, the drive wheel and the throwing-off wheel all rotate at an equal rotational speed and are driven by a common drive.

In order to be able to move the receiving mechanism in the afore-discussed manner from the operation position to the position suitable for transport, a still further advantageous embodiment of the invention uses a receiving mechanism which extends beyond the permissable vehicle width and which, when in the operating position, is essentially provided at the side of the loading area of the transport wagon and can be pivoted, for transport purposes, to a position in front of the wall closing the loading area of the transport wagon. The pivoting of the receiving mechanism is done according to an embodiment of the invention in such a manner that the receiving mechanism, when in operation, is freely pivotable about a sloping axis extending downwardly in the driving direction.

According to a still further advatageous embodiment of the invention, the receiving mechanism is arranged on a downwardly extending swivel arm and is pivotable about a transverse axis with respect to the swivel arm and is securable in at least two positions. The additional pivotability of the receiving mechanism about a transverse axis on the swivel arm has the advantage that the receiving mechanism can be put into a position which, when in the lifted transport position, occupies less space and thus can be moved farther in front of the wall so that the addition of said mechanism is possible also to transport wagons having a far forwardly extending front wall.

According to a still further embodiment of the invention, the pivot mechanism for the receiving mechanism is constructed in such a way that the receiving mechanism is rigidly connected to a swivel arm which is pivotable about a transverse axis and is securable in at least two positions and, when in the operating position, is freely pivotable about an axis extending almost horizontally in the driving direction. This embodiment also allows an adjustment of the receiving mechanism before swinging same upwardly so that same does not collide with parts of the transport wagon during shifting in front of the wall.

Of course, the conveying, stacking and horizontal shifting of the bales on the transport wagon, as previously mentioned, is done fully automatically. For this purpose, according to the invention, each one of the drives is associated with control valves, which valves assure at predetermined intervals the discontinuous drive of the lifting device, of the wall and of the moving floor.

Further characteristics of the device of the invention which allow an automatic loading and unloading of a transport wagon with bales by one single man, by the tractor driver, will be described hereinbelow with reference being made to the accompanying drawings in which.

Figure 1:
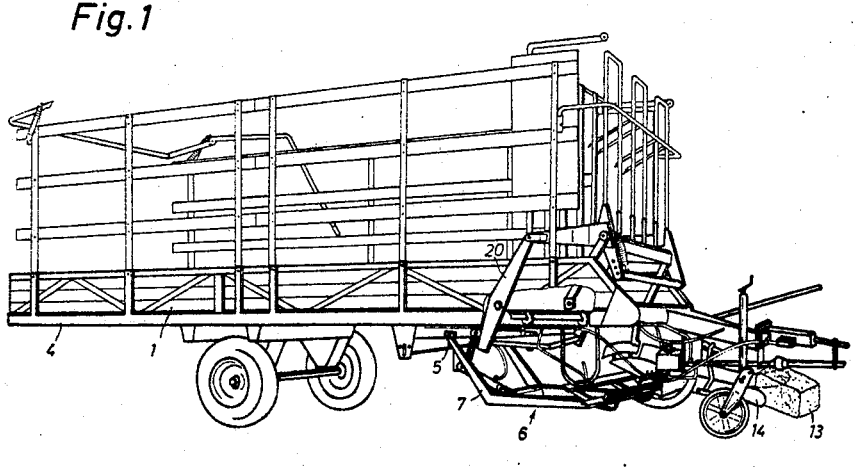
FIGURE 1 is a perspective view of a transport wagon embodying the invention.

The transport wagon (FIGURE 1) has, in the usual manner, one or two axles and has relatively low sidewalls 1. An opening 2 (FIGURE 2) is provided in the load carrying surface at the front of the wagon in the illustrated embodiment. However, said opening can also be arranged at the rear end of the wagon. The load carrying surface is behind the opening 2 and is equipped with a known moving floor. Underneath the opening 2, on bearings 5 arranged on both sides of the frame 4 of the transport wagon, there is pivotably arranged a lifting mechanism 6. Said lifting mechanism, which in its cross section corresponds approximately to the breadth of the loading station of the transport wagon, is comprised of two obtuse-angled lifting arms 7 which are interconnected by two transverse bars 8 and 9 (FIGURE 3). A hydraulic cylinder 10 is mounted on a support 11 on the frame 4 of the wagon and engages the rear transverse bar 8.

Figure 4:
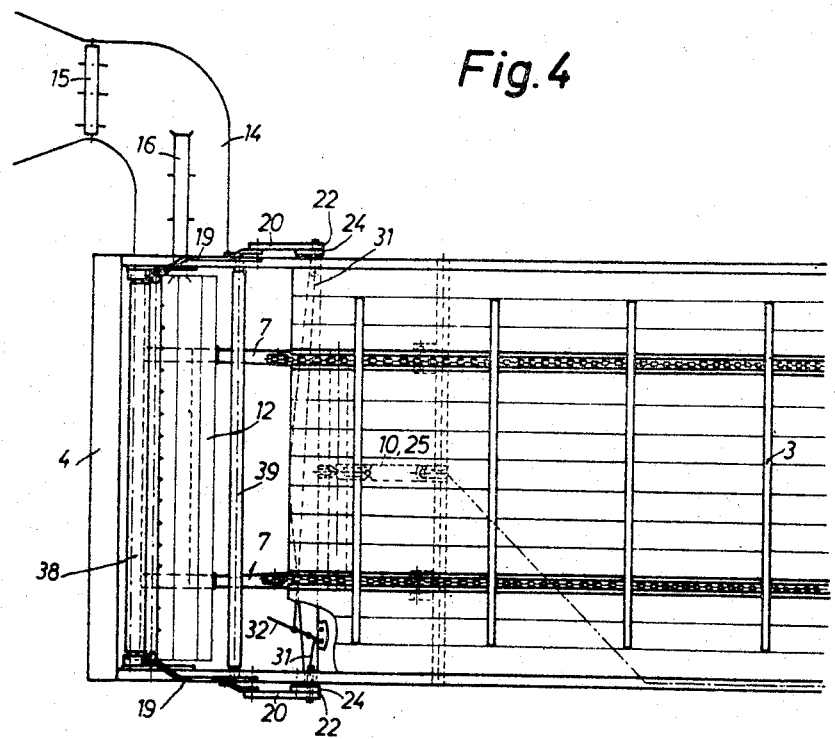
FIGURE 4 is a top view of FIGURE 3.

Several strips of wood 12 are affixed to the two lifting arms 7 in the area of the front transverse bar 9, said strips of wood forming a trough-shaped support for the bales 13. Said support 12 can also be constructed by using different means, for example as a closed receiver for the bales. A mechanism 14 (FIGURES 1 and 4) for receiving the bales 13 is arranged in front of the side of the transport wagon outside of the tongue, said receiving mechanism being releasably connected to the wagon. The receiving mechanism 14 can be constructed in a known manner as a trough-shaped, sloping conveyer chute which has, for example, conveyer chains 15, 16 provided with hooks arranged on its base. Other preferred embodiments of the receiving mechanism are described hereinbelow in connection with FIGURES 8 to 13.

The load carrying surface of the transport wagon is bounded by the sidewalls 1 and by the walls 17 and 18 to the front and to the rear, respectively. The front wall 17 is movable back and forth by guide rods 19 and 20 arranged on both sides of the frame 4 of the transport wagon, said guide rods defining generally a parallelogram guide. The guide rods 20 extend beyond their pivot support 21 to form lifting arms 22. A U-shaped crossbar 23 (FIGURE 3) is also supported at the pivot 21 between the two levers 22, the length of said crossbar corresponding generally to the width between the levers 22. A hydraulic cylinder 25 engages said crossbar 23, said cylinder 25 being positioned generally above the cylinder 10 in the center of the wagon and also being mounted on the support 11. The cylinder 25 functions to drive the moving floor 3 and the front wall 17. The driving connection with the moving floor 3 is accomplished through the utilization of a cable 27 (FIGURES 2 and 3) pivotally connected to the crossbar 23 at 26, said cable being guided over one or several rollers 28 underneath the transport wagon and being connected to a common locking pawl or freewheeling catch 29 (FIGURE 2) arranged on the end of the transport wagon. Several holes 26 arranged in side-by-side relation are provided for securing the cable 27 to the crossbar 23, which permits the adjustment of the drive transmission to the moving floor 3. The drive connection with the front wall 17 is accomplished by providing bores 30 at the ends of the levers 22, said bores being in alignment with bores provided in the legs 24 of the crossbar 23. A locking means 31 (FIGURE 4) is arranged on the crossbar 23 and is guided thereby to lock the levers 22 to the crossbar 23. Said locking means is operable through a lever 32. If the levers 22 are in locking engagement with the crossbar 23, the cylinder 25 drives both the moving floor 3 and the front wall 17 simultaneously, while when the locking means 31 is in the unlocked position, only the moving floor 3 is driven which is particularly advantageous during unloading since the front wall 17 then has no purpose.

The rear wall 18 is connected to the moving floor 3 by means of bolts 33 (FIGURE 5) engaging the chain of said moving floor and is guided along the sidewalls by rollers 34 which are secured on arms 35 connected to the wall, said sidewalls for this purpose being provided with guide rails 36 having a U-shaped cross section which have the rollers 34 sliding therein. Thus, the wall 18 moves together with the moving floor 3 in a direction longitudinal of the wagon over the load carrying surface. If the rear wall 18 is brought into its forwardmost position which is at the front end of the moving floor 3 close to the opening 2, the front wall 17 together with the rear wall 18 define a conveyor chute extending over the opening 2. The bales 13 are then one after the other fed into said chute by the lifting mechanism 6 to thus form a stack. In order to prevent the bales 13 which are moved into said chute from falling back out through said opening 2, a bale holder 38 is secured to the wall 17 and is provided with projections 37 (FIGURE 3) arranged at the wall 17 and at the frame 4 of the transport wagon, approximately at the height of the load carrying surface. Across from the bale holder 38 at a horizontal distance of slightly less than the width of one bale there is arranged a support 39 extending over the width of the transport wagon, which support can for example be constructed as a roller. Upon lifting of the bales 13 by the mechanism 6 into the conveyer chute, the bales touch the bale holder 38 and move same to the elevated position 38' as illustrated in FIGURE 3. The bales are thereby in a slightly rearwardly inclined position (FIGURE 3) which is caused by the conveyer path of the lifting mechanism 6. During the return of the lifting mechanism 6, the bales in the conveyer chute tend to drop downwardly due to their weight. The barbs 37 thereby engage the bales, the bale holder 38 swings back again and pushes the bales into a rectangular position whereby the rear lower edge of the bales come to rest on the support 39 which together with the bale holder 38 prevents a further sliding back of the bales.

The mounting holes for the support 39 are advantageously constructed as slotted holes 40 in the frame 4, said holes allowing an adjustment of the support 39 in the longitudinal direction of the transport wagon. Thus, the opening 2 can be changed in size by being adjusted to accommodate different bale sizes or widths. However, it is also possible to pivotably arrange the support 39 on the frame 4 by which a better effect against a sliding back of the bales can be achieved because the support 39 can give way during lifting of the bales and then swing back into its initial position by its own weight so that the bales safely come to rest. Of course, it is also possible to maintain in this structure the adjustability in the longitudinal direction of the transport wagon.

Figure 2:
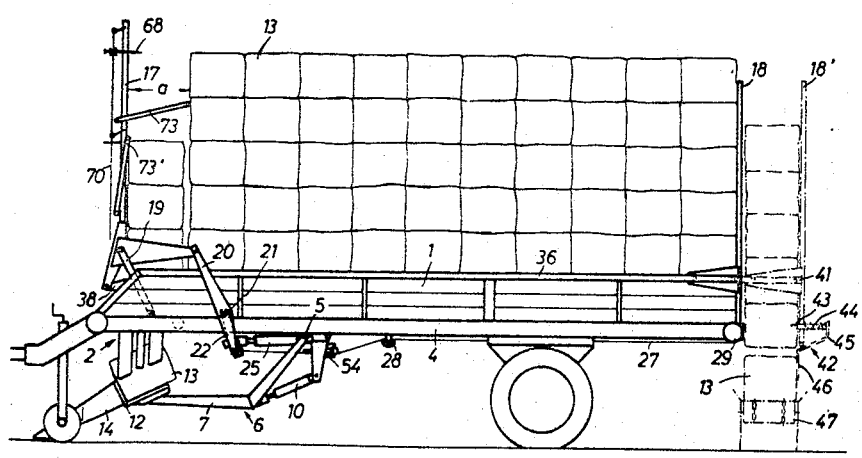
FIGURE 2 is a side-elevational view of the transport wagon.
Figure 3:
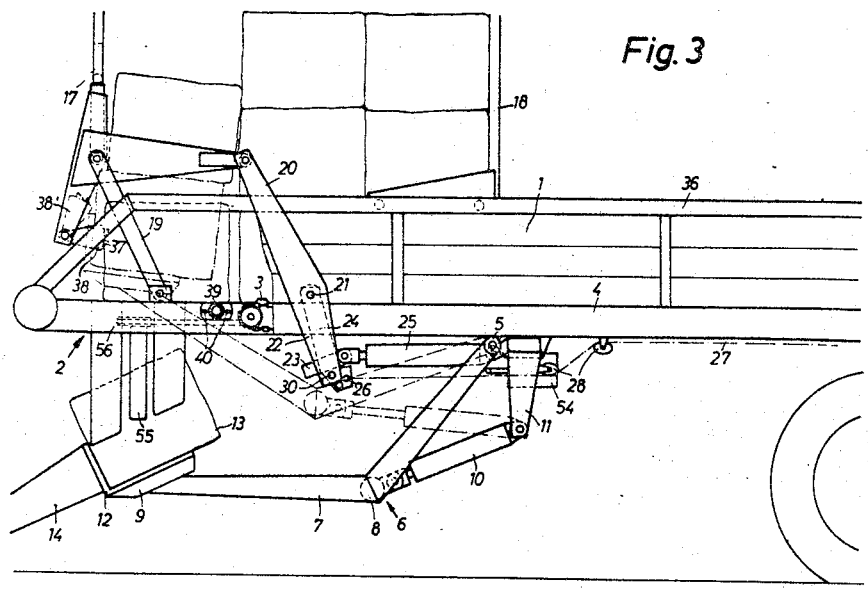
FIGURE 3 illustrates an enlarged side-elevational view of the front of the transport wagon showing the lifting mechanism and the movable front wall.

FIGURE 2 further illustrates in dash-dotted lines how the rear end of the transport wagon could, for example, be constructed to allow a mechanical unloading and conveying of the bales onto a haystack or similar storage area. For this purpose the guide rails 36 arranged at the sidewalls 1 are extended beyond the length of the loading area of the transport wagon for at least one bale width so that the wall 18 can be moved beyond the length of the wagon for said distance. By means of the extensions 41, there is provided between the end of the moving floor 3 and the rear wall 18 when moved into the position 18' an opening such that the bales, when moved in stacks rearwardly for unloading by the moving floor, can fall downwardly, for example, onto a lift conveyer 47. In order to prevent the entire stack of bales from sliding downwardly or falling in an unorganized manner onto the lift conveyer 47, a bale holding mechanism 42 is arranged at the unloading end of the transport wagon. Said bale holding mechanism can, for example, be comprised of teeth 43 movably arranged on the wall 18, said teeth being biased by a spring 44 into engagement with the lowermost bale which is still on the transport wagon for preventing same from sliding down. There is further provided a swingable toggle lever, one leg 45 of which is connected to the movable teeth, while the other leg 46 is used as a control lever through which the teeth 43, against the effect of the spring 44, are pulled out of the bales transported onto the lift conveyer so as to set free the following bales so that same can fall onto the lift conveyer.

Of course it is also possible to quickly unload the transport wagon without said mechanism. Thus, the stacks of bales can be conveyed one after the other to the end of the transport wagon by means of the moving floor 3 and can there be pulled down by the operator who is using a suitable tool.

Figure 6:
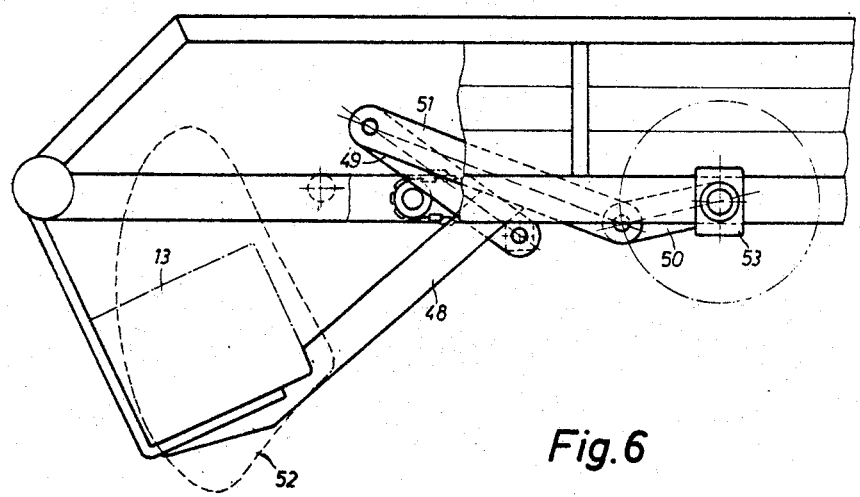
FIGURE 6 illustrates a further embodiment of the lifting mechanism.

A further advantageous embodiment for a lifting mechanism is illustrated in FIGURE 6. Same comprises two lifting arms 48 which are each connected to the coupling member 49 of a crank arm construction arranged at both longitudinal sides of the transport wagon. The crank arm construction comprises a crank 50, a link arm 51 and the coupling member 49. The crank 50, the link arm 51, and the coupling member 49 are thereby adjusted and moved relative to one another with respect to their lengths and positions in such a way that the coupling curve 52 produced by the lifting arm 48 shows such a path that the lifting arms upon lifting brush the conveyer area of the bales and during their return come out of the conveyer area. This structure of a lifting mechanism has the advantage that the lifting arms 48 during their back and forth movement, if a next bale has already been lifted up by the receiving mechanism 14, do not collide with said next bale. The crank arm construction can, for example, be driven by known hydraulic motor 53.

Figure 7:
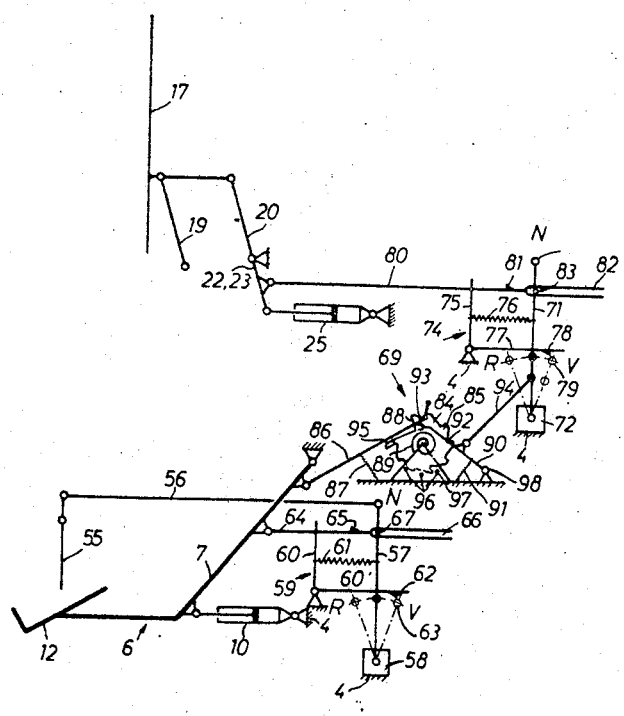
FIGURE 7 is a schematical illustration of the automatic control device for the lifting mechanism and the front wall.

For a better understanding, FIGURE 7 schematically illustrates the control device 54 which is arranged on the transport wagon and which acts onto the drive cylinders 10 and 25 or the hydraulic motor 53 for a completely automatic conveying, stacking and horizontal moving of the bales on the loading area of the transport wagon.

The device and its automatic control operates as follows:

During driving of the transport wagon which, for example, is hitched to a tractor, the bales lying on the ground are picked up by the receiving mechanism 14 which is arranged on the side of the transport wagon and conveyed onto the lifting mechanism by the conveyer chains 15, 16. When the second bale arrives on the lifting mechanism, the first lifted bale touches a limit switch 55 which is arranged in the area of the lifting mechanism on the side of the transport wagon opposite the receiving mechanism 14. Said limit switch 55 which is connected through a link 56 to the lever 57 of a valve 58 associated with the cylinder 10 moves the lever 57 into forward driving position V so that oil can flow into the cylinder 10 and the lifting mechanism 6 can be moved to the position illustrated in dash-dotted lines in FIGURE 3. Thus, the bales resting on their support 12 are moved through the opening 2 onto the transport wagon.

A toggle lever 59 is pivotably arranged at the frame 4 of the transport wagon, a tension spring 61 being hingedly connected to one leg 60 of said toggle lever. Said tension spring is connected to the lever 57 and tends to pull said lever 57 into a reverse driving position R while the other leg 60' has a nose 62 which engages a cam arrangement on the lever 57 and holds same in the forward driving position during lifting. A control rod 64 is pivoted to the lifting mechanism, said control rod having a nose 65 which is effectively connected to the leg 60 of the toggle lever 59 and a fork-shaped guide 66 which cooperates with a cam arranged on the valve lever 57. When the lifting mechanism 6 during lifting has reached the uppermost position, the nose 65 touches the leg 60 and slightly deflects the toggle lever 59 counterclockwise whereby the cam 63 on the valve lever 57 is freed from its locked position on the nose 62 and is pulled into the reverse driving position R by the spring 61. At this instant the lifting mechanism 6 returns to its initial position and, shortly before the lifting mechanism reaches its lowermost position, the guide 66 contacts the cam 67 whereby the valve lever 57 is moved into the neutral position N. The lifting mechanism is then ready to pick up the next bales which, during the next lifting are transported in the same manner in the transport wagon. The lowermost bale is held by the bale holder 38 and the support 39 so that a sliding back of said bales through the opening 2 is not possible. The bales are, in this manner, moved one after the other and stacked up to form a stack. The desired stacking height or load height can be adjusted either by a stop 68 arranged adjustably in height on the transport wagon (FIGURE 2) or by a counter 69 (FIGURE 7).

Figure 5:
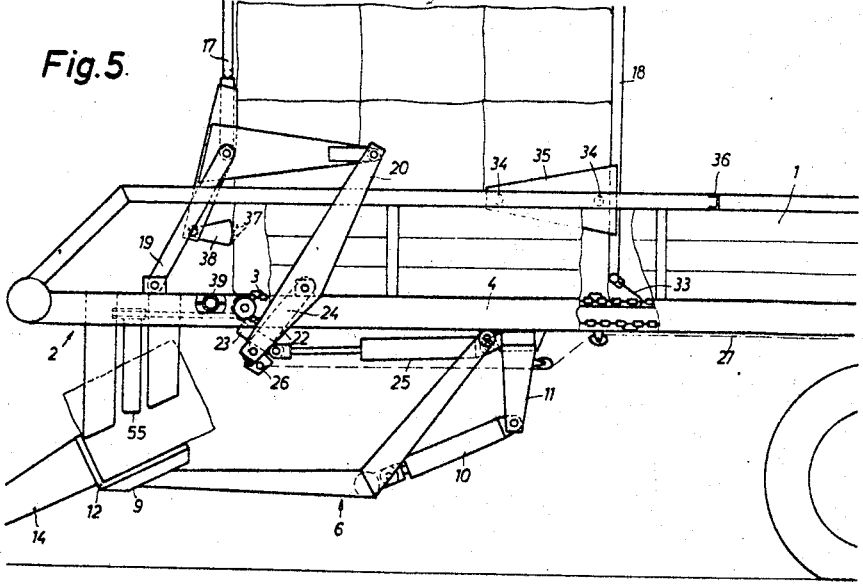
FIGURE 5 illustrates the front wall moved to a new position equal to the width of one bale.

By adjusting the loading height by means of the stop 68, the uppermost bale touches the stop 68 when it reaches the loading height, which stop is connected, for example, through a Bowden wire 70 or the like to the lever 71 (FIGURE 7) of a valve 72 associated with the cylinder 25 and deflects the valve lever 71 into a forward driving position V so that oil can flow into the cylinder 25 through which the wall 17 driven by same and the moving floor 3 are moved for at least one bale width rearwardly in the longitudinal direction of the wagon from the position of FIGURE 3 into the position illustrated in FIGURE 5. Thus, the stack built by the lifting mechanism 6 is moved by the moving floor 3 away from the opening 2 so that the opening 2 remains empty for building the next stack.

In order to prevent the bales stacked on the wagon from tipping while being moved, they are held in back by the rear wall 18 and in front by the bale supports 73 (FIGURE 2) pivotably arranged on the front wall 17, which supports can, for example, be constructed as U-shaped crossbars. The bale supports 73 are deflected upwardly during upward movement of the stacks of bales into the position 73' as illustrated in FIGURE 1 and, during movement of the stack, they abut said stack and hold the moved load at a distance $a$ from the wall 17, which distance is required for an unhindered upward transporting of the following bales, so that the load cannot tip over for example when driving on uneven grounds.

The forward and reverse movement of the cylinder 25 is controlled in the same manner as the movement of the cylinder 10. Thus, a toggle lever 74 (FIGURE 7) is pivotably arranged at the frame 4 of the wagon, and has a tension spring 76 connected to one leg 75 thereof. The tension spring 76 is also connected to the lever 71 and tends to pull said lever 71 into the reverse driving position R while the other leg 77 of the toggle lever 74 has a nose 78 which engages a cam 79 arranged on the lever 71 and holds same in the forward driving position during movement of the stack.

A control rod 80 (FIGURE 7) is pivoted to the crossbar 23 or the lever 22 which is engaged by the cylinder 25, said control rod having a nose 81 effectively connected to the leg 75 of the toggle lever 74 and a fork-shaped guide 82 which cooperates with a cam 83 arranged on the valve lever 71. If the load is moved on the loading surface, namely, when the wall 17 has arrived at its rearward position, the nose 81 touches the leg 75 and deflects the toggle lever 74 slightly counterclockwise whereby the cam 79 on the valve lever 71 is freed from the nose 78, with valve lever 71 then being pulled into the reverse driving position by the spring 76. At this instant the wall 17 returns to its front initial position and, shortly before reaching this initial position, the guide 82 contacts the cam 83 whereby the valve lever 71 is moved into the neutral position N. The next moving process can start from this position when the following stack has reached its loading height.

By adjusting the loading height by means of the counter 69, the desired number of the bales to be stacked one on top of the other is counted by means of said counter and valve 72 associated with the cylinder 25 is operated by means of said counter.

The counter 69 (FIGURE 7) essentially comprises a toothed wheel 84 with correspondingly shaped teeth 85. A push rod 86 pivoted to the lifting mechanism 6 engages said teeth, said push rod being resiliently held in an engaged position by a tension spring 87. The base of the tooth 88 is cut deeper than the bases of the remaining teeth 85. The toothed wheel 84 tends to rotate in one direction under the effect of a spiral spring 89 and is prevented from rotating in said one direction by a lever 90 which is biased by a tension spring 91. The lever 90 is extended beyond its blocking cam 92 and has a fork 93 at its end which, when in a rest position, is provided in the area of the deeper cut base of the tooth 88. Furthermore, the lever 90 is hingedly connected by means of a rod 94 with the lever 71 of the valve 72. A stop 95 is provided at the periphery of the toothed wheel 84, said stop cooperating with a bolt 97 placed in bores 96. By placing a bolt 97 into a different bore 96 the loading height can be varied.

The counter 69 operates as follows:

The stop 95 abuts the bolt 97 in the initial position. As many teeth 85 as bales are to be stacked one on top of the other are provided between the tooth 88 and the engaged position of the push rod 86. The push rod 86 rotates the toothed wheel 84 for one tooth 85 during each swinging or transporting process of the lifting mechanism 6. When the push rod 86 arrives in the deeper cut base at the tooth 88, it engages the fork 93 of the blocking lever 90 and deflects same clockwise about its pivot axis 98. The valve lever 71 is thereby moved into the forward driving position V through the connecting rod 94 so that oil flows into the cylinder 25 and the wall 17 and the moving floor 3 are moved in the same manner as by operating the valve lever 71 through the stop 68 as explained above. The toothed wheel 84, due to the effect of the spiral spring 89, rotates back to its initial position at the same time so that counting of the bales for the next stack can begin.

The adjustment of loading height of the stack with the counter 69 is, for example, advantageous in the case of different bale sizes or thicknesses because it is assured that, after transporting a number of bales as adjusted on the counter, the stack is moved into the loading area while, in the case of the stop 68, the stack must achieve a certain height before said stop will operate.

The valve 72 of the cylinder 25 can be operated by hand for unloading by means of a cable line 99 (FIGURE 7).

It is, of course, possible to modify the above-described device within the scope of the invention in various ways. It is, for example, possible to provide higher sidewalls 1 and to cover the opening 2 so that the wagon can also be used for transporting different agricultural goods. To speed up the unloading of the transport wagon, the moving floor 3 of said wagon can be drivingly coupled with the moving floor of an intermediate storage area so that the bales on the transport wagon can constantly be moved from said wagon to said storage area. A power take-off or stub shaft can for this purpose be provided on the transport wagon. Said stub shaft assures that the moving floor movement of the transport wagon and the intermediate storage area is performed with the same speed. It is also possible to drive the moving floor of the intermediate storage area and also the moving floor of the transport wagon from an energy source through a controllable gearing, so that an even speed of both moving floors can be adjusted by a corresponding adjustment of the gearing.

Figure 8:
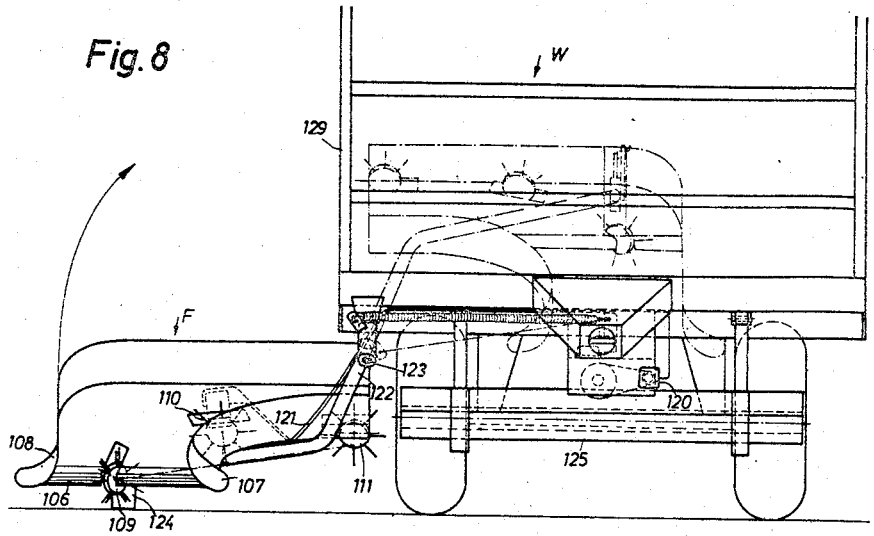
FIGURE 8 is a front view of the conveyor arranged laterally of the transport wagon.
Figure 9:
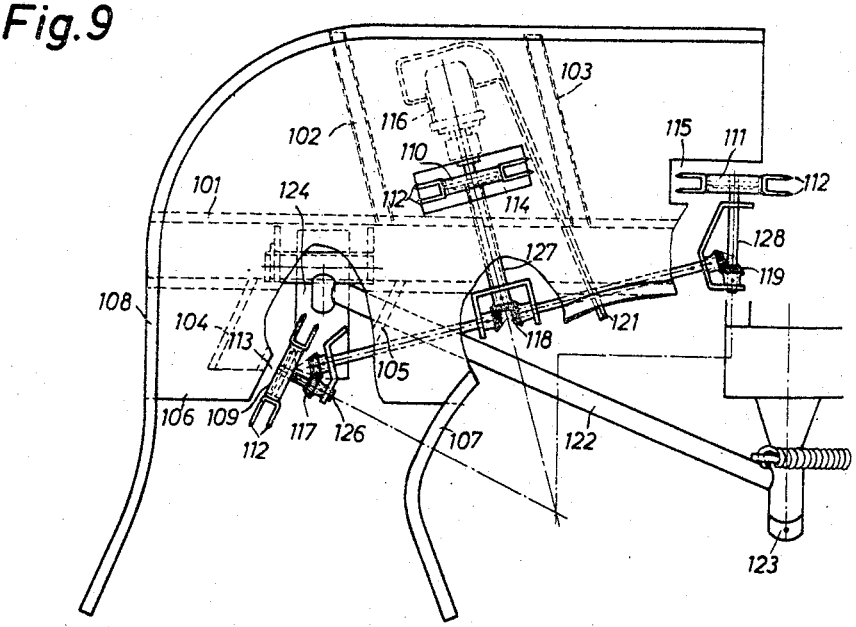
FIGURE 9 is a top view of the conveyer, namely tilted into the plane of the illustration.

The frame of this conveyor F of the receiving mechanism illustrated in the embodiment of FIGURES 8 and 9 comprises, for example, a U-shaped crossbar 101 and ribs 102, 103, 104, 105 which can also be bent to a U-shape. The crossbar 101 may be connected to the ribs, as by welding.

A guide trough, comprised of a bottom plate 106 and two sidewalls 107 and 108 standing upright from said bottom plate, is secured to the frame, said trough being L-shaped at approximately 90°. The two sidewalls 107, 108 diverge at their front ends so that they form a searching guide for the bales to be received. Toothed wheels 109, 110, 111 are arranged on the frame of the conveyor underneath the bottom 106 to receive and move the bales, said toothed wheels being advantageously provided with acutely shaped double teeth 112 which extend through recesses 113, 114, 115 provided in the bottom 106. The Toothed wheels 109, 110 111 are driven with the same rotational speed through miter gears 117, 118, 119 by a hydraulic motor 116 arranged underneath the bottom 106 of the frame of the conveyor. The motor 116 is fed through a conduit 121 by a pump arranged on the transport wagon W, said pump being driven by the tractor through a connecting shaft. It is, of course, possible to feed the motor 116 directly from the tractor hydraulic circuit if the necessary connections for the conduit 121 are provided on the tractor.

The conveyor F is, through the arm 122, pivotally supported on the transport wagon about an axis 123 and, during operation, slides on a skid 124 at the side of the transport wagon. As illustrated in FIGURE 8, the conveyor chute 106, 107, 108 has a rearwardly inclined position during operation. During driving over the field, the bales which had been placed in a row on the ground by a bale press are caught between the front diverging ends of the sidewalls 107, 108 and are engaged by the teeth 112 of the toothed wheel 109 which forms the receiving wheel and are transported to the bottom 106 of the conveyor chute. The toothed wheel 110, which can also be identified as the guide wheel, turns the conveying direction of said bales and the toothed wheel 111 throws off the bales which have been deflected approximately 90° and according to the illustrated embodiment, the bales are moved onto a stacking mechanism 125 arranged on the transport wagon. The toothed wheels are arranged in series, offset to one another corresponding to the curved shape of the conveyor chute in such a way that their bearing axes 126, 127, 128 between two adjacent toothed wheels each define an angle of less than 90°. The position of the toothed wheels with respect to the inner sidewall 107 is chosen so that they are directed in the conveying direction approximately parallel or slightly at an acute angle with respect to said sidewall 107 so that the bales received by the wheel 109 can slide upwardly along the inner sidewall 107, being guided in the conveyor chute and easily and slowly deflected without an undesired friction at their sidewalls or a tearing of the bales by the toothed wheels.

It is also advantageous to arrange the toothed receiving wheel 109 and guide wheel 110 at such a distance from the inner sidewall 107 that they engage the bales off-center, namely outside their center of gravity. This favors the deflection of the bales within the conveyor chute. Thre throwing-off wheel 111, which is positioned at the upper end of the conveyor, engages the bales at their center of gravity so that they are moved in a straight direction to the stacking mechanism 125.

A particularly advantageous pivot connection of the receiving mechanism is illustrated in FIGURES 10 to 13 whereby, through this construction without reducing the ground clearance and without extending the entire structural length of the transport wagon, the receiving mechanism can be moved into a transporting position in which said wagon can drive on public roads and small field paths.

According to the embodiment illustrated in the drawings, the receiving mechanism 201 is pivotally connected to a transport wagon 202. Said wagon 202, which can be connected to a tractor or the like through a tongue 204, is provided with a rolling or moving floor 205. Said moving floor 205 does not extend over the entire loading surface but ends spaced away from the wall 206 so that an opening 207 is provided in the floor of the wagon for conveying the bales into the loading area of the transport wagon 202. A conveyor swing 208 is swingably arranged for back and forth movement underneath the wagon 202 in the area of the opening 207, said swing taking the bales transported upwardly by the receiving mechanism 201 and transporting same into the loading area of the transport wagon 202. The receiving mechanism 201 which, for example, consists of a conveyor channel comprised of a bottom 209 and two sidewalls 210 and 211 has several driven star wheels 212 positioned in series at the bottom 209, said star wheels picking up the bales lying on the ground and transporting same to the conveyor swing 208.

An axis 213 dropping off or extending downwardly in the driving direction is arranged at the right or left longitudinal side of the wagon 202, the receiving mechanism 201 being pivotally supported about said axis 213 through an arm 214 which can, if necessary, also be constructed so as to be adjustable in length. During operation, the receiving mechanism 201 is supported on the ground by a skid 215 which, if desired, can be constructed so as to be adjustable in height. The receiving mechanism 201, which extends beyond the permissible vehicle width, is pivotable about the axis 213 into a transporting position in front of the wall 206 as illustrated by dash-dotted lines in FIGURE 11.

To make the shift easier, a spring 217 (FIGURE 11) is arranged between the receiving mechanism 201 and the wagon 202, said spring receiving part of the weight of the receiving mechanism 201 during the deflection movement. Instead of the spring 217 a hydraulic cylinder could, for example, be provided for this purpose. Due to the inclined, forwardly dropping off position of the axis 213, it is possible to shift the receiving mechanism 201 from its operating position, which is required to be laterally at the side of the wagon close to the wall 206, to the transport position in front of the wall as illustrated in dash-dotted lines in the drawings so that a driving of the wagon on narrow paths and on public roads is possible without incidents or endangering traffic.

Figure 10:
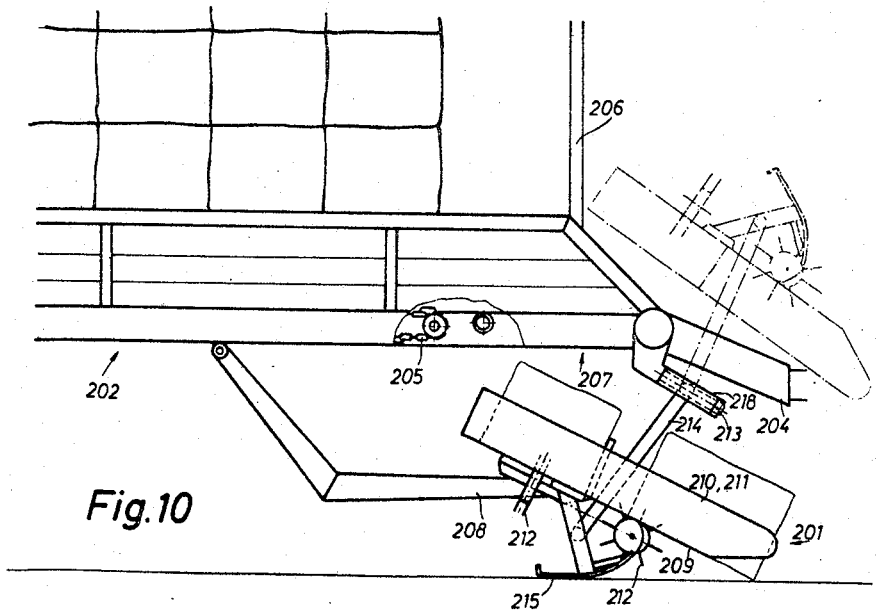
FIGURE 10 illustrates the front of a transport wagon with a linkage mechanism for the pickup device.
Figure 11:
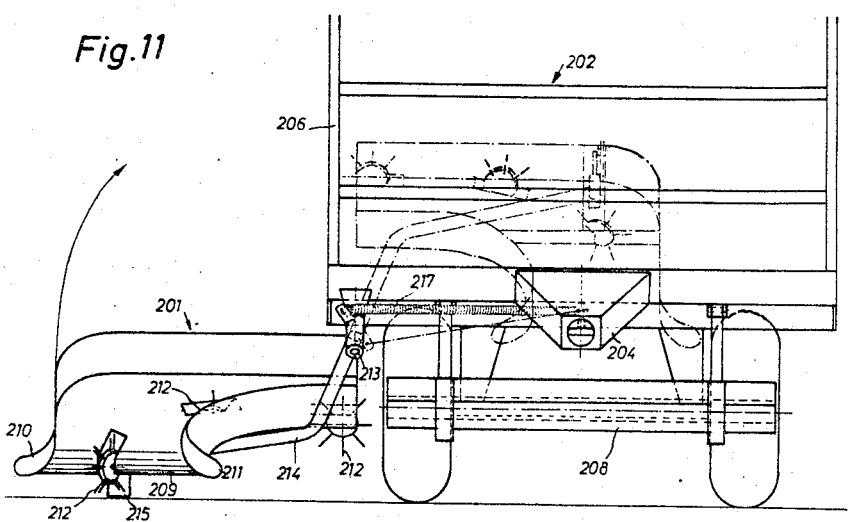
FIGURE 11 is a front-elevational view of a transport wagon according to FIGURE 10.

In the embodiment of FIGURES 10 and 11, the receiving mechanism 201 is tightly connected to the swivel arm 214 which, with its other end, is pivotably arranged through a hub 118 about the axis 213.

Figure 12:
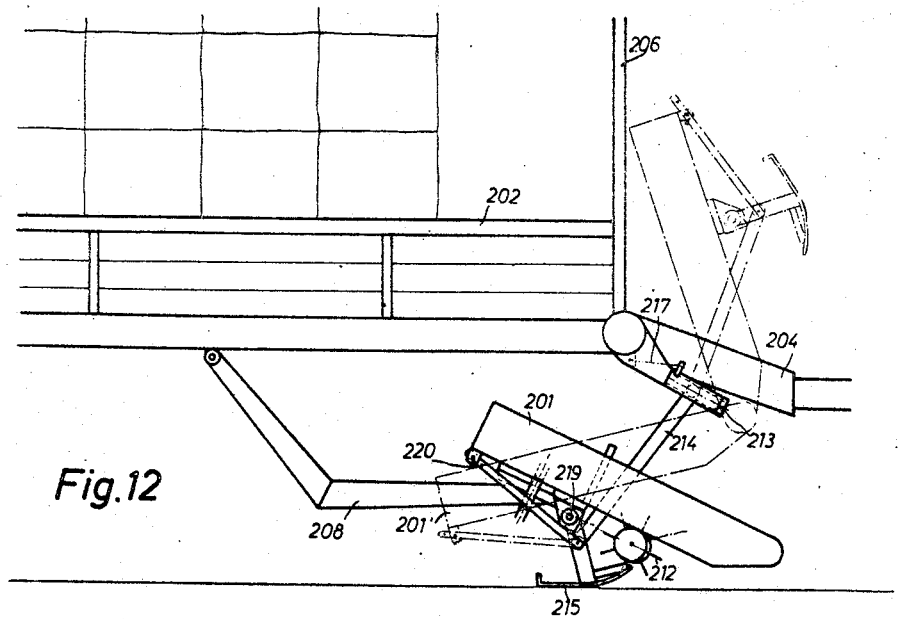
FIGURE 12 illustrates an embodiment of the linkage in which the pickup device can additionally be adjusted about a transverse axis.

In a modified embodiment, as illustrated in FIGURE 12, the receiving mechanism 201 is pivotable at the swivel arm 214 about an axis 219 extending transverse to the driving direction and can be secured in two or several positions by means of a plug 220 or the like. The receiving mechanism is for operation, as is commonly done, secured in a rearwardly rising position. If the receiving mechanism is to be pivoted to the transporting position, said receiving mechanism is pivoted about the axis 219 into the position 201' illustrated in dash-dotted lines in FIGURE 12 after the locking mechanism 220 has been released, and is thereafter pivoted upwardly about the axis 213 in front of the wall 206. As illustrated in FIGURE 12, due to the preceding pivotal movement about the axis 219, the receiving mechanism 201, with its outer edges, comes to rest further in front of the wall 206 than in the embodiment of FIGURES 10 and 11. Said pivoting has the advantage that the receiving mechanism can also be built onto transport wagons with a far extended front wall or, if desired, can be arranged at the side of the harvest wagon farther behind the front wall.

Figure 13:
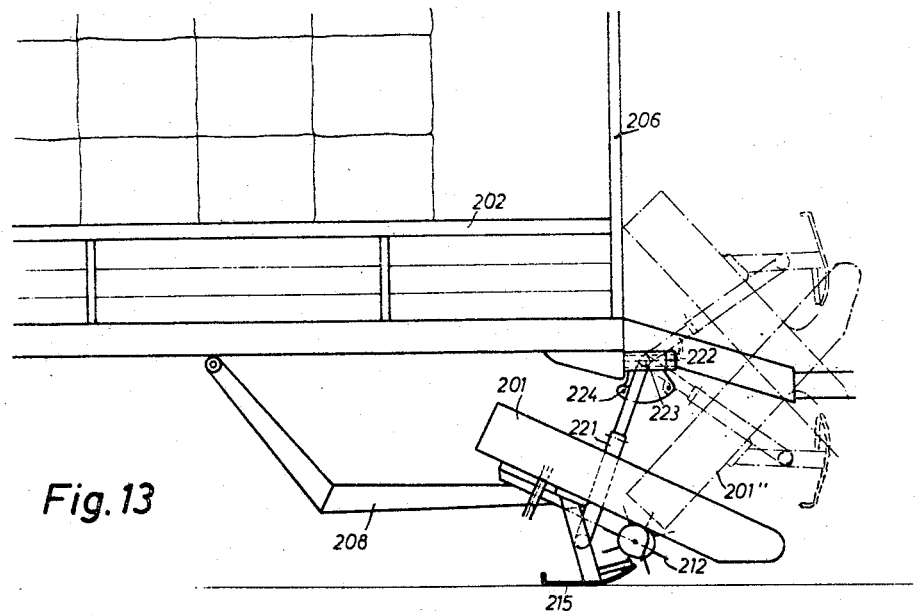
FIGURE 13 illustrates a further embodiment of the linkage mechanism.

A further embodiment for the pivoting of the receiving mechanism is illustrated in FIGURE 13. The receiving mechanism is, in this embodiment as well as in the embodiment of FIGURES 10 and 11, rigidly connected to a swivel arm 221. However, said swivel arm 221 is not, like the swivel arm 214, pivotable about a forwardly dropping off axis but is pivotal about an almost horizontally positioned axis 222. In order to also allow for a shifting of the receiving mechanism 201 from the side of the wagon to a position in front of the wall 206, the swivel arm 221 can additionally be pivoted in a limited manner about an axis 223 which is transverse to the driving direction with the swivel arm 221 being secured in its end positions by means of a plug 224. If the receiving mechanism is to be shifted from its operating position to the transporting position, the locking mechanism 224 is released and said receiving mechanism 210 is pivoted forwardly about the axis 223 into the position 201" illustrated in dash-dotted lines in FIGURE 13. Thus, the receiving mechanism is put into a forwardly rising position and is then pivoted upwardly about the axis 222 in front of the wall 206. As illustrated in FIGURE 12 of the drawings, a receiving mechanism with such a pivoting movement can also be built onto transport wagons with a far extended front wall.

The pivoting mechanism of the invention is, of course, not limited to the above-described receiving mechanism but the swivel arm can be constructed so that a loading device can be mounted thereto, which loading device is comprised of a receiving, a transverse conveying and a pressing mechanism as they are used in transport wagons for an automatic loading of loose agricultural goods, like ensilage, hay, straw or the like. It is only decisive that the receiving mechanism can be shifted from its operating position on the side of the wagon to a transport position in front of the wagon with a loading mechanism which opens up into the loading area from below or from the side.

The embodiments of the invention in which an exclusive property or privilege is claimed are defined as follows:

1. A device for automatically loading bales of straw, hay or the like onto a transport wagon having a frame and a loading surface, comprising:

a moving floor comprising at least a part of said loading surface;

lifting means for conveying bales upwardly and building a vertical stack from the bottom thereof, said lifting means being positioned adjacent one end of said moving floor below said loading surface and being pivotably mounted on said frame for movement about a transverse axis;

holding means cooperating with said lifting means for preventing the bales from falling back during lowering of said lifting means;

loading means for moving the stack of bales onto the loading surface of said transport wagon, said loading means including a movable wall positioned close to said lifting mechanism and mounted on said wagon for back and forth movement for moving said stack of bales onto said loading surface; and receiving means for supplying bales to said lifting means.

2. A device according to claim 1, wherein the lifting means includes at least two lifting arms which are swingably arranged spaced apart in side-by-side relation on the frame of the transport wagon, said lifting arms being connected by front and rear transverse bars, with said front transverse bar being provided with a trough-shaped support for the bales.

3. A device according to claim 2, wherein the lifting means includes a drive means in engagement with the rear tranverse bar.

4. A device according to claim 1, wherein said loading means includes a parallelogram linkage having guide links on both sides of the frame, each guide link having an extension beyond its pivot bearing and drive means engaging the end of of the said extension for moving said wall.

5. A device according to claim 1, wherein the holding means for the lifted bales has a bale holder provided with barbs and arranged on said wall, said bale holder being swingable in a limited manner.

6. A device according to claim 5, wherein said holding means further includes a support positioned approximately at the height of the loading surface opposite the bale holder at a horizontal distance slightly less than one bale width with said support extending over the width of the transport wagon.

7. A device according to claim 6, wherein the support is adjustable in the longitudinal direction of the transport wagon or is swingably mounted on the frame.

8. A device according to claim 1, wherein at least one bale support is swingably supported on said wall.

9. A device according to claim 1, wherein the transport wagon is provided with a tilting device.

10. A device according to claim 1, wherein the moving floor has a length less than the length of the transport wagon by a distance of at least one bale width with the remaining loading surface of the transport wagon being open from below.

11. A device according to claim 1, including a drive means connected to said moving floor and to said movable wall.

12. A device according to claim 1, wherein the movable wall is guided by rollers or the like sliding on the sidewalls of the transport wagon.

13. A device according to claim 1, further including a second wall movable for at least one bale width beyond the length of the loading surface of the transport wagon to allow unloading of the bales.

14. A device according to claim 13, further including a bale holding mechanism arranged at the unloading end of the transport wagon, said bale holding mechanism being controllable by the bales transported by a lift conveyer or the like.

15. A device according to claim 1, wherein the lifting means includes two lifting arms each connected to the coupling member which is interconnected to a crank arm construction arranged on opposite longitudinal sides of the transporting wagon, whereby the free ends of the lifting arms define a closed path of movement such that the lifting arms upon lifting pass through the bale area so as to pick up a bale and during the return movement pass around the bale area so as to not interfere with the next bale.

16. A device according to claim 15, wherein the crank arm construction is driven by a hydraulic motor.

17. A device according to claim 1, when said receiving means comprises an upwardly sloping conveyer which is of an arc-shaped construction and is arranged on one of the longitudinal sides of the loading surface close to the front end of said wagon, said conveyer including a bottom wall and two sidewalls forming an arc-shaped guide trough, and conveyer means mounted on said bottom wall for forcedly receiving bales on said conveyer and for deflecting and forwarding or throwing out said bales.

18. A device according to claim 17, wherein said conveyer means comprises driven toothed wheels or the like mounted on the frame of the conveyer, the teeth of said toothed wheels extending through recesses provided in the bottom wall.

19. A device according to claim 18, wherein the bearing axes of two adjacent toothed wheels define an angle of less than 90°, and wherein the toothed wheels are arranged approximately parallel to or at a slight acute angle with respect to the inner sidewall of said conveyer.

20. A device according to claim 18, wherein said driven toothed wheels include a receiving wheel and a guide wheel which as seen in the conveying direction, engage the bales outside of their center of gravity and a throwing-off wheel which engages the bales approximately at the center of gravity.

21. A device accrding to claim 20, wherein the receiving, guide and throwing-off wheels have a common drive means and rotate at an equal rotation speed.

22. A device according to claim 1, wherein said receiving means extends beyond the permissible vehicle width when in an operating position substantially at the side of the loading surface of the wagon, and including means mounting said receiving means on said wagon to permit said receiving means to be shifted into a transport position wherein said receiving means is positioned in front of the wall closing the front end of the loading surface of the wagon.

23. A device according to claim 22, wherein the receiving means on the wagon is, when in operation, freely pivotable about a sloping axis extending in the driving direction.

24. A device according to claim 23, wherein the receiving means is mounted on a downwardly extending swivel arm and is pivotable about an axis transverse with respect to the swivel arm and can be secured in at least two positions.

25. A device according to claim 22, wherein the receiving means is connected to a swivel arm which is pivotable about a traverse axis and is securable in at least two positions and, when in the operating position, is freely pivotable about a substantially horizontal axis extending in the driving direction.

26. A device according to claim 1, further including control means for controlling the discontinuous driving of the lifting means and the movable wall, said control means including a valve associated with a drive means at predetermined intervals, the forward movement of said valve being operated by a stop which is operated by the bales and the return movement of said valve being operated by the lifting means, and further including a second valve associated with a second drive means, the forward movement of said second valve being released by a second stop which is operated by one of the bales or by the lifting means through a counter or by hand through a cable line, the return movement of said second valve being released by the movable wall.

27. A device according to claim 26, wherein said first-mentioned stop is arranged in the area of the lifting means on the side of the transport wagon opposite the receiving means.

28. A device according to claim 26, wherein the second stop is adjustable with respect to the height on the transport wagon.

29. A device according to claim 26, wherein each valve has a valve lever which is pulled by a spring into a reverse driving position and is held by lock bolts in a forward driving position.

30. A device according to claim 26, wherein the loading height can be adjusted by changing a stop bolt at the counter.

31. A device according to claim 26, wherein the second drive means for the movable wall and the moving floor can be switched on selectively by hand.

32. A device according to claim 1, wherein said loading means includes a parallelogram linkage means positioned adjacent both sides of said transport wagon and interconnected between said frame and said movable wall for guiding said wall for back and forth movement.

References Cited
UNITED STATES PATENTS

| | | | |
|---|---|---|---|
| 1,945,426 | 1/1934 | Evoy. | |
| 2,755,944 | 7/1956 | Wetz. | 214—42 X |
| 2,983,395 | 5/1961 | Hook | 214—130 |
| 3,159,287 | 12/1964 | Stroup. | |
| 3,278,050 | 10/1966 | Tarbox. | |

GERALD M. FORLENZA, Primary Examiner

R. J. SPAR, Assistant Examiner

U.S. Cl. X.R.

198—7; 214—77, 8.5, 522, 83.36